United States Patent Office 3,468,952
Patented Sept. 23, 1969

3,468,952
**N-DICHLOROACETYL-β-(p-FLUOROPHENYL)-
ALANINE AND ITS SODIUM SALT**
Gustav Ehrhart, Bad Soden, Taunus, Dietmar Gericke,
Frankfurt am Main, and Heinrich Ott, Eppstein,
Taunus, Germany, assignors to Farbwerke Hoechst
Aktiengesellschaft vormals Meister Lucius & Bruning,
Frankfurt am Main, Germany
No Drawing. Filed May 3, 1966, Ser. No. 547,171
Claims priority, application Germany, May 6, 1965,
F 45,972
Int. Cl. C07c *103/32*
U.S. Cl. 260—518        2 Claims

ABSTRACT OF THE DISCLOSURE

N-dichloroacetyl-β-(p-fluorophenyl)-alanine and its sodium salt, useful as inhibitors for antibody formation.

It is already known to prepare β-(p-fluorophenyl)-alanine as well as the corresponding N-acetyl derivative thereof (cf' for instance, J. Am. Chem. Soc. 72 (1960), p. 1800).

Now, we have found that N-dichloroacetyl-β-(p-fluorophenyl)alanine or the salts of this compound are obtained by introducing a dichloroacetyl radical into β-(p-fluorophenyl)-alanine, or by hydrolyzing the ester or nitrile groups present in a compound of the formula

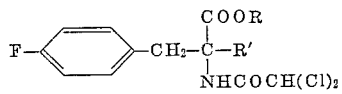

wherein R represents lower alkyl having 1 to 4 carbon atoms and R' represents hydrogen, carbalkoxy, or nitrile, and decarboxylating the compounds obtained, if necessary. If desired, the compound can be converted into its corresponding salts by treatment with an inorganic base.

The product of the present invention is a valuable medicament characterized by a low toxicity and, in particular, by a strong inhibiting action on the formation of antibodies against microbial antigens. It may, furthermore, be used as an intermediate product for the preparation of pharmaceutically interesting compounds.

The reaction according to the process of the invention is carried out in known manner. An advantageous method of operation consists in acylating p-fluoro-phenyl-alanine in the usual manner. The β-(p-fluorophenyl)-alanine used as starting substance can be prepared, for instance, according to the method described in J. Am. Chem. Soc. 72 (1950), p. 1800.

For introducing the dichloroacetyl radical, dichloroacetic acid as well as its reactive derivatives, for instance, the acid chloride, anhydride, azide and cyanide or an ester of said acid with a phenol or with a lower aliphatic alcohol such as methanol or ethanol, are appropriate. The reaction of the free dichloroacetic acid with p-fluoro-phenyl-alanine takes place upon heating of both components and continuous separation of the water liberated in the course of the reaction or upon addition of water-separating agents to the mixture of both reactants. As such water-separating agents there may be used, for instance, methoxy-acetylene or N,N'-dicyclohexylcarbodi-imide. The acylation of β-(p-fluorophenyl)-alanine can likewise be carried out by means of phosphorus-(III)-chloride. It is of particular advantage to react β-(p-fluorophenyl)-alanine with dichloracetyl chloride. This exothermic reaction is preferably carried out with the use of solvents. It is suitable to bind the hydrogen halide liberated in the course of the reaction by means of appropriate basic substances. As solvents for said reaction, there are preferably used inert organic solvents such as ether, tetrahydrofurane, chloroform, methylene-chloride, benzene, toluene, ethyl acetate and the like. It is likewise possible to operate in an aqueous medium, in which case the reaction is advantageously carried out with vigorous stirring or shaking and while using inorganic alkaline agents for binding the hydrogen chloride set free in the course of the reaction. As said alkaline agents the following may be used, for example: sodium hydroxide, potassium hydroxide, barium hydroxide, sodium carbonate, potassium carbonate, calcium carbonate or barium carbonate, magnesium oxide, sodium bicarbonate, and the like.

When operating in an organic phase, an agent binding hydrogen-halide is not absolutely necessary. In this case, the above-mentioned inorganic substances can likewise be used in the form of suspensions or together with organic bases such, for instance, as pyridine, quinoline, triethylamine, and the like. After termination of the exothermic reaction, which is carried out with external cooling if necessary, depending on the quantity of the batch, the substance is worked up as usual. When the reaction is carried out in an aqueous solution, the product formed separates in crystalline form in a neutral or acid medium. If the reaction is performed in organic solvents, the compounds generally remains in dissolved state in the solvent. For working up the substance it is favorably separated by filtration with suction from the organic or inorganic salts formed in the course of the reaction, or the accompanying substances are extracted with water and the organic solvent is concentrated.

In the above-described reaction of dichloroacetic acid anhydride with β-(p-fluorophenyl)-alanine, it is advantageous to allow the combined reaction components to stand for a prolonged period of time at room temperature or to heat them under reflux; in this case, the acylating agent may be used in excess and serves then simultaneously as solvent. However, the already mentioned organic solvents may also be used.

For working up, the reaction mixture is suitably poured into ice-water,whereby the reaction product is obtained directly. It is also possible to remove excess acylating agent or diluent by distillation.

The product of the present invention may also be prepared by the reaction of β-(fluorophenyl)-alanine with a lower alkyl ester, a cyanomethyl ester or a phenyl ester of dichloroacetic acid. In this case, both reactants are heated to the boil under reflux, suitably in the presence of a solvent such as methanol, and the reaction product is isolated after removal of the solvent by distillation.

Another advantageous method of carrying out the process of the present invention consists in acylating β-(fluorophenyl)-alanine by means of dichloroacetyl cyanide. This reaction also takes place upon shorter or prolonged boiling of both reaction components under reflux, advantageously in the presence of inert organic solvents such as tetrahydrofurane or similar solvents. This method of preparation is of advantage insofar as hydrogen cyanide in gaseous form is liberated during the reaction so that no side products must be removed when working up.

Even the reaction of β-(fluorophenyl)-alanine with chloral or chloralhydrate in the presence of alkali metal cyanides, wherein dichloroacetyl cyanide is formed intermediately, is suitable for the preparation of the product of the present invention. The reaction can be carried out in the presence of water or of lower aliphatic alcohols according to the method described in Chem. Abstracts 52 (1958), page 18 235.

Another method of preparing N-dichloroacetyl-β-(p-fluorophenyl)-alanine consists in partially hydrolysing N-dichloroacetamino-p-fluorobenzyl malonic acid ester and then decarboxylating the resulting product. The N-dichloroacetamino-p-fluorobenzyl malonic acid ester is advantageously obtained by condensation of p-fluorobenzyl chloride with dichloroacetamino malonic acid ester, which itself can be prepared according to the method described in Chem. Abstracts 49, page 185.

The partial hydrolysis of N-dicholoracetamino-p-fluorobenzyl malonic acid ester is suitably carried out in an alkaline medium, because under these conditions the N-dichloroacetyl radical is not split off. The reaction components are heated for several hours with a dilute sodium hydroxide solution, whereby the ester groups are hydrolysed, the whole is then acidified and the acid solution is heated until the evolution of carbon dioxide ceases. The product of the invention is obtained directly from this acid solution and is worked up in the usual manner.

Finally, another method of carrying out the process of the present invention consists in converting, instead of β-(p-fluorophenyl)-alanine, an ester of β-(p-fluorophenyl)-alanine ester with a lower alcohol, into its molecular alcohols, in the manner described above into its N-dichloroacetyl derivative and subsequently hydrolysing the ester group in the manner described above.

N-dichloroacetyl-β-(p-fluorophenyl)-alanine can be converted into the corresponding salts with the aid of inorganic bases. As inorganic bases, there may be used, for example, sodium hydroxide, potassium hydroxide, sodium carbonate and sodium bicarbonate. The salts of the compound with these bases are easily water-soluble and they are, therefore, preferably used for parenteral administration.

The product of the present invention has a strong inhibiting action on the formation of antibodies against microbial antigens, and a very low toxicity. This fact was very surprising, since a corresponding action, attributed by Ryan (Science 143, page 479/1964) to 1-phenylalanine, was not reproducible. It is known that a series of cytostatic substances possess such activity, for example, 6-mercaptopurine as an antimetabolite and nitrogen-phosphorus amide isothiocyanate as an alkylating substance. These two substances mentioned have the disadvantage of having, as do all cytostatics, a considerable total toxicity.

The inhibiting action of the products of the invention on antibody formation in comparison to that of 1-phenylalanine was determined in the following manner:

Rabbits were given a suspension of *Clostridium butyricum* as an antigen for immunization. Two days before the administration of the antigens, the administration of 1-phenylalanine (48 mg./kg.) and N-dichloroacetyl-β-p-fluorophenyl-alanine (100 mg./kg. and 200 mg./kg., respectively), respectively, was begun. The administration was continued until the day on which blood serum was taken for the determination of antibodies; the latter was done on the 14th day after the administration of antigens.

The examination for agglutinating antibodies showed the following result:

| Preparation: | Antibody titer (dilution of serum at which agglutination still occurred) |
|---|---|
| 1-phenylalanine | 1:1280 |
| N-dichloroacetyl-β-(p-fluorophenyl)-alanine (100 mg./kg.) | 1:10 |
| N-dichloroacetyl-β-(p-fluorophenyl)-alanine (200 mg./kg.) | 1:10 |
| Control (physiological salt solution) | 1:1920 |

This test was carried out several times with the same result.

The following examples illustrate the invention but they are not intended to limit it thereto:

EXAMPLE 1

10 grams of β-(p-fluorophenyl)-alanine were shaken for a short time with 100 milliliters of ether, 10 grams of dichloroacetic acid chloride and 5 grams of sodium carbonate and slowly combined with a small quantity of water while continuing shaking. After about 10 minutes, the reaction was complete. The reaction mixture was combined with dilute hydrochloric acid until it showed an acid reaction to Congo paper and the ether layer was separated. After drying the separation of the ether by distillation, 9 grams of N-dichloroacetyl-β-(p-fluorophenyl)-alanine melting at 142–144° C. were obtained.

EXAMPLE 2

10 grams of β-(p-fluorophenyl)-alanine were boiled for 1 hour under reflux with 30 milliliters of dichloroacetic acid anhydride. The reaction mixture was then concentrated under reduced pressure. From the residue, N-dichloroacetyl-β-(p-fluorophenyl)-alanine was obtained in crystalline form. After recrystallization from toluene, the compound was found to melt at 142–143° C.

8 grams of N-dichloroacetyl-β-(p-fluorophenyl)-alanine were suspended in 50 milliliters of water and combined with the calculated amount (2.28 grams) of NaOH. The clear solution was filtered with charcoal and evaporated to dryness under reduced pressure.

6 grams of sodium salt of N-dichloroacetyl-β-(p-fluorophenyl)-alanine were obtained in the form of a microcrystalline white powder.

We claim:

1. N-dichloroacetyl-β-(p-fluorophenyl)-alanine.

2. The sodium salt of N-dichloroacetyl-β-(p-fluorophenyl)-alanine.

References Cited

J.A.C.S., by Edward L. Bennett et al., vol. 72 (1960), pp. 1800–1803 relied on.

LORRAINE A. WEINBERGER, Primary Examiner

L. A. THAXTON, Assistant Examiner

U.S. Cl. X.R.

260—999